US 8,729,827 B2

(12) United States Patent
Esaki et al.

(10) Patent No.: US 8,729,827 B2
(45) Date of Patent: May 20, 2014

(54) SEMICONDUCTOR LIGHT EMITTING ELEMENT DRIVE DEVICE AND LIGHTING FIXTURE WITH THE SAME

(71) Applicant: Panasonic Corporation, Osaka (JP)

(72) Inventors: Sana Esaki, Osaka (JP); Akinori Hiramatu, Nara (JP)

(73) Assignee: Panasonic Corporation, Osaka (JP)

( * ) Notice: Subject to any disclaimer, the term of this patent is extended or adjusted under 35 U.S.C. 154(b) by 10 days.

(21) Appl. No.: 13/731,246

(22) Filed: Dec. 31, 2012

(65) Prior Publication Data
US 2013/0207571 A1    Aug. 15, 2013

(30) Foreign Application Priority Data

Feb. 13, 2012 (JP) .................................. 2012-028325

(51) Int. Cl.
| | |
|---|---|
| G05F 1/00 | (2006.01) |
| H05B 37/02 | (2006.01) |
| H05B 39/04 | (2006.01) |
| H05B 41/36 | (2006.01) |
| H05B 33/08 | (2006.01) |

(52) U.S. Cl.
CPC ........ *H05B 33/0809* (2013.01); *H05B 33/0815* (2013.01); *H05B 33/0833* (2013.01)
USPC ........... 315/297; 315/257; 315/279; 315/299; 315/307

(58) Field of Classification Search
None
See application file for complete search history.

(56) References Cited

U.S. PATENT DOCUMENTS

| | | | |
|---|---|---|---|
| 7,071,762 B2 | 7/2006 | Xu et al. | |
| 2003/0085749 A1 | 5/2003 | Xu et al. | |
| 2011/0109248 A1* | 5/2011 | Liu ................................ | 315/297 |
| 2013/0099691 A1* | 4/2013 | Esaki et al. ................... | 315/210 |

FOREIGN PATENT DOCUMENTS

JP        2006-511078 A      3/2006

* cited by examiner

*Primary Examiner* — Anh Tran
(74) *Attorney, Agent, or Firm* — Renner, Otto, Boisselle & Sklar, LLP

(57) ABSTRACT

A semiconductor light emitting element drive device includes: a converter circuit configured to supply a light source unit with a load current from a first-primary winding; and a current regulation circuit. The converter circuit further includes a second-secondary winding. The current regulation circuit includes a switching device (second switching device) connected in series with the second-secondary winding. In a dimming ratio of the light source unit is lower than a first ratio, the second switching device is controlled to ON and OFF so as to decrease the load current through the light source unit by a shunt of a part of the energy stored in the primary winding.

9 Claims, 9 Drawing Sheets

US 8,729,827 B2

SEMICONDUCTOR LIGHT EMITTING ELEMENT DRIVE DEVICE AND LIGHTING FIXTURE WITH THE SAME

TECHNICAL FIELD

The invention relates to a semiconductor light emitting element drive device and a lighting fixture with the same.

BACKGROUND ART

Japanese patent application publication Number JP2006-511078A1 discloses a supply assembly (hereinafter referred to as "lighting device") for an LED (a light emitting diode) lighting module for supplying an electric power.

This lighting device includes, as shown in FIG. 10, a series circuit of, a diode D100 and a control switch 101 of a MOSFET, connected between both ends of a DC power supply 100. A series circuit of an inductor L100 and a LED lighting module 102 is connected between both ends of the diode D100.

A controller 103 is adapted to generate a dual PWM switching signal and supply the signal to an input of the control switch 101 through an amplifier 104. The dual PWM switching signal is composed of a low frequency busts including high frequency pulses.

The controller 103 includes a current mode pulse width modulator 105. The current mode pulse width modulator 105 is configured to receive: an LED current reference signal from a power source 106 a detected current; and a high frequency saw-teeth wave. The current mode pulse width modulator 105 applies a high frequency pulse width modulation switching signal to one of inputs of an AND gate 107, and output signal of the AND gate 107 is supplied to a gate of the control switch 101 through the amplifier 104.

Therefore, this lighting device can change an average current through the LED lighting module 102, in order to vary the light intensity outputted by the LED lighting module 102, by varying the low frequency component of the dual PWM switching signal.

In what is called a burst dimming system for dimming such that a load current intermittently flows through the LED lighting module 102, it is necessary to set a burst frequency to a comparatively low frequency (about 120 Hz) in order to dim the luminous flux low level.

In the burst dimming system, because the load current intermittently flows through the LED lighting module, there is an idle period during which no load current flows through the module. Therefore, there is a concern of visible flicker caused by interference with a specific frequency of video equipment (e.g. a video camera) when the LED lighting module is seen through the video equipment.

By the way, in an amplitude control system for varying a peak value of a load current through an LED lighting module, a load current continuously flows through the LED lighting module. Therefore, in the amplitude control system, it is possible to reduce a possibility of generation of visible flicker when the LED lighting module is seen through the video equipment.

However, if the amplitude control system is applied to an LED lighting module having an LED array, there is a problem that elements (LEDs) of the LED array each have dispersion in brightness. Because the elements of the LED array have dispersion in a forward voltage, and may have 15% or more dispersion in some array or element types, and therefore a voltage applied to the LED lighting module may decrease when luminous flux from the module under dimming is low. The problem becomes more marked as the number of LEDs connected in series is increased.

DISCLOSURE OF INVENTION

It is an object of the present invention to suppress such visible flicker when a light source unit is shot with video equipment, and also to reduce dispersion in brightness among elements of the light source unit when the unit is dimmed so that luminous flux from the unit becomes low.

1st aspect of a semiconductor light emitting element drive device of the invention comprising: a direct-current power supply circuit configured to output direct-current power; a converter circuit which has a transformer and a first switching device, said transformer having a primary winding and first- and second-secondary windings, said first- and second-secondary windings being same polarity with each other, and said first switching device being connected to said primary winding, wherein said converter circuit being configured to receive the power outputted from said direct-current power supply circuit and to supply a load current to a light source unit comprising light emitting elements by way of said first-secondary winding, said converter circuit being configured to control the load current by variably controlling an ON width of said first switching device; a current regulation circuit which has a second switching device connected in series with said second-secondary winding, said current regulation circuit being configured to more decrease an energy supplied to said first-secondary winding from said primary winding so as to more decrease the load current supplied to said light source unit along with the increase of an ON width of said second switching device; and a control unit configured to control ON and OFF of said first and second switching devices, wherein said control unit is configured, (a-1) if increasing a dimming ratio of said light source unit in a range where the dimming ratio of said light source unit is higher than a first ratio, to increase the ON width of said first switching device with said second switching device kept off, (a-2) if decreasing the dimming ratio of said light source unit in a range where the dimming ratio of said light source unit is higher than the first ratio, to decrease the ON width of said first switching device with said second switching device kept off, and (b) in a range where the dimming ratio of said light source unit is lower than the first ratio, to regulate the ON width of said second switching device with the ON width of said first switching device held at a lower limit, thereby controlling the dimming ratio of said light source unit.

In other words, the 1st aspect of a semiconductor light emitting element drive device of the invention comprising: a direct-current power supply circuit configured to output direct-current power; a converter circuit which has a transformer and a first switching device, said transformer having a primary winding and a first-secondary winding, and said first switching device being connected to said primary winding, wherein said converter circuit being configured to be input the power outputted from said direct-current power supply circuit and to supply a load current to a light source unit comprising light emitting elements from said first-secondary winding, said converter circuit being configured to control the load current by variably controlling an ON width of said first switching device; a current regulation circuit configured to regulate an energy supplied to said first-secondary winding from said primary winding so as to regulate the load current supplied to said light source unit; and a control unit, characterized in that: said transformer of said converter circuit further has a second-secondary winding, said first- and second-secondary windings being same polarity with each other; said current regulation circuit has a second switching device connected in series with said second-secondary winding, said current regulation circuit being configured to decrease the energy supplied to said first-secondary winding from said primary winding so as to decrease the load current supplied to said light source unit as the increase of an ON width of said second switching device; and said control unit is configured to control ON and OFF of said first and second switching devices, wherein said control unit is configured, (a-1) if increasing a dimming ratio of said light source unit in a range where the dimming ratio of said light source unit is higher than a first ratio, to increase the ON width of said first switching device with said second switching device kept off, (a-2) if decreasing the dimming ratio of said light source unit in a range where the dimming ratio of said light source unit is higher than the first ratio, to decrease the ON width of said first switching device with said second switching device kept off, and (b) in a range where the dimming ratio of said light source unit is lower than the first ratio, to regulate the ON width of said second switching device with the ON width of said first switching device held at a lower limit, thereby controlling the dimming ratio of said light source unit.

2nd aspect of a semiconductor light emitting element drive device of the invention includes the 1st aspect of the invention, and wherein said current regulation circuit comprises: a series circuit, of an impedance component and a capacitor, connected in parallel with said light source unit; a third switching device adapted to discharge said capacitor when said third switching device is turned on; and an inductor placed along a discharge path of said capacitor, wherein in a range where the dimming ratio of said light source unit is lower than a second ratio, a pulse voltage derived from an induced power of said inductor generated when said third switching device discharges said capacitor is superposed on an output of said converter circuit.

3rd aspect of a semiconductor light emitting element drive device of the invention includes the 1st or 2nd aspect of the invention, and wherein an ON and OFF frequency of said second switching device is set to a higher frequency than that corresponding to a video equipment's shutter speed.

4th aspect of a semiconductor light emitting element drive device of the invention includes the 2nd aspect of the invention, and wherein an ON and OFF frequency of said third switching device is set to 120 Hz or more.

5th aspect of a semiconductor light emitting element drive device of the invention includes the 2nd or 4th aspect of the invention, and wherein the second ratio is set to be smaller than the first ratio, and said control unit is configured: to keep said third switching device turned off in a range where the dimming ratio of said light source unit is higher than the second ratio; and to control ON and OFF of said third switching device in a range where the dimming ratio of said light source unit is lower than the second ratio.

6th aspect of a semiconductor light emitting element drive device of the invention includes 2nd or 4th aspect of the invention, and wherein the second ratio is set to equal to the first ratio, and said control unit is configured: to keep said third switching device turned off in a range where the dimming ratio of said light source unit is higher than the second ratio; and to control ON and OFF of said third switching device in a range where the dimming ratio of said light source unit is lower than the second ratio.

7th aspect of a semiconductor light emitting element drive device of the invention includes any one of the 2nd, 4th, 5th and 6th aspects of the invention, and wherein said control unit comprises a microcomputer configured to control ON and OFF of at least one of said first to third switching devices based on a dimming signal from outside.

8th aspect of a semiconductor light emitting element drive device of the invention includes any one of 1st to 7th aspects of the invention, and wherein said transformer further has a third-secondary winding of a reversed polarity to said first-secondary winding, and said semiconductor light emitting element drive device generates a drive power of said current regulation circuit by commutating and smoothing a voltage produced across said third-secondary winding.

A lighting fixture of the invention, comprising the any one aspects of the semiconductor light emitting element drive device of the invention, and said lighting fixture comprises: said light source unit which comprises light emitting elements and is adapted to be driven with said semiconductor light emitting element drive device; and a fixture body in which said semiconductor light emitting element drive device and said light source unit are placed.

According to the present invention, it is possible to suppress visible flicker when a light source unit is shot with video equipment, and also to reduce dispersion in brightness among elements of the light source unit when the unit is dimmed so that luminous flux from the unit becomes low.

BRIEF DESCRIPTION OF DRAWINGS

FIG. 4 includes FIG. 4A and FIG. 4B, wherein FIG. 4A is a waveform diagram of a measured drain current of a switching device Q2, and FIG. 4B is a waveform diagram of a measured gate voltage of the switching device Q2, according to the first embodiment;

FIG. 5 includes FIG. 5A and FIG. 5B, wherein FIG. 5A is a waveform diagram of a measured drain current of a switching device Q2, and FIG. 5B is a waveform diagram of a measured voltage generated across a third-secondary winding N4, according to the first embodiment;

FIG. 8 includes FIG. 8A and FIG. 8B, wherein FIG. 8A illustrates a waveform of a forward voltage on which pulse voltages are superposed, and FIG. 8B is a graph showing variation of the forward voltage and a forward current when the pulse voltages are superposed on the forward voltage;

DESCRIPTION OF EMBODIMENTS

Embodiments of the present invention are described below with referring to the attached drawings.

(First Embodiment)

Figure 1:
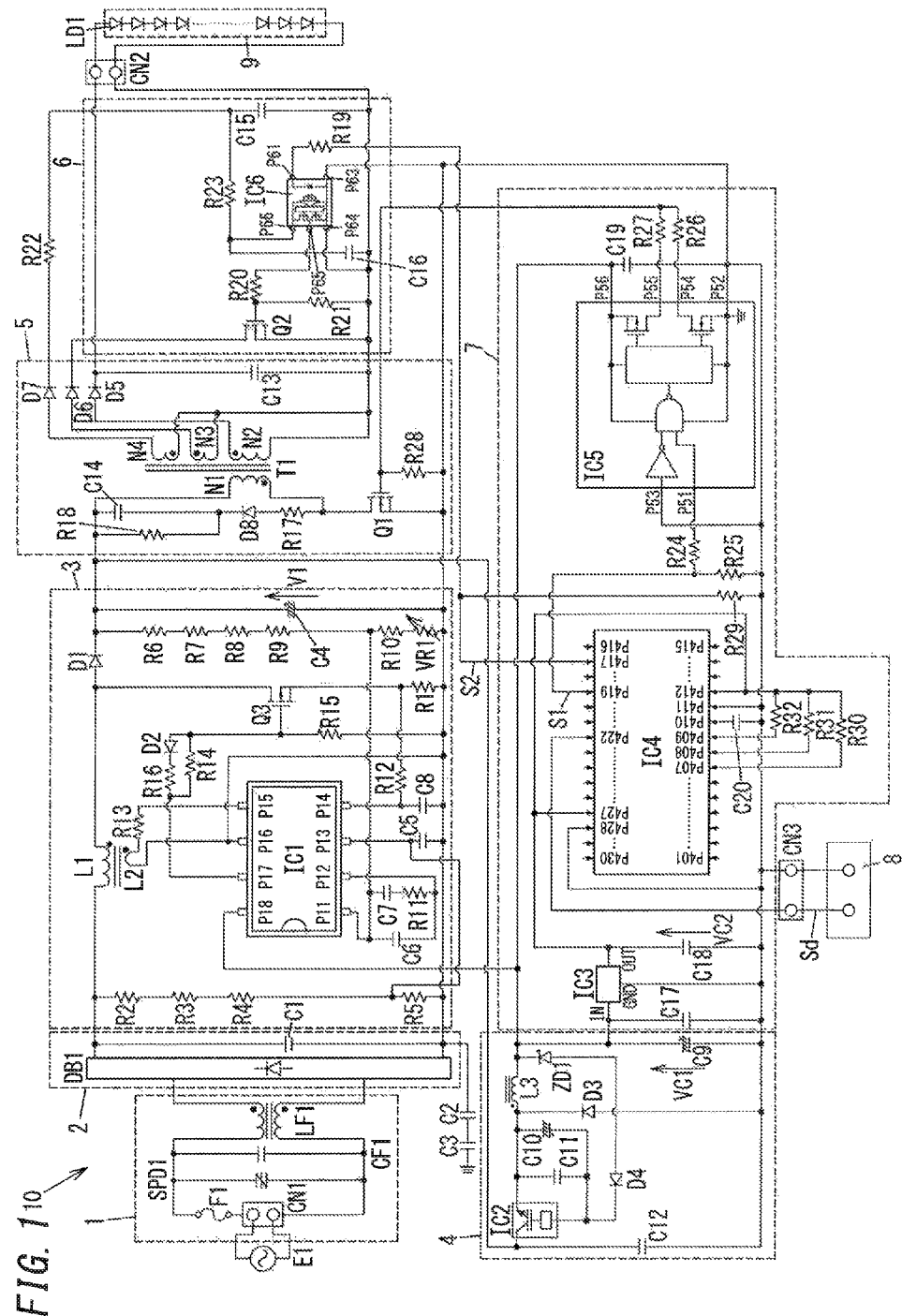
FIG. 1 is a circuit diagram of a semiconductor light emitting element drive device according to a first embodiment of the present invention.

FIG. 1 shows a circuit diagram of a semiconductor light emitting element drive device 10 (hereinafter referred to as a "lighting device 10") in the embodiment. The lighting device 10 includes: a filter circuit 1; a rectifier circuit 2; a boost chopper circuit 3; a control power circuit 4; a flyback converter circuit 5; a current regulation circuit 6; a control unit 7; and an external dimmer 8. An input power source for the lighting device 10 is a commercial power supply E1, and the lighting device 10 is configured to supply an electric current to a light source unit 9 including a plurality of (in the embodiment, e.g., 32) light emitting diodes LD1, thereby lighting the light source unit 9, where the light emitting diodes correspond to light emitting elements of the present invention. A configuration of the lighting device 10 is hereinafter explained.

The filter circuit 1 is formed of: an input terminal CN1 which can be connected to the commercial power supply E1; a current fuse F1; a surge protector device SPD1; a filter capacitor CF1; and a line filter LF1. The input terminal CN1 is connected to an input terminal of the line filter LF1 through the current fuse F1. Each of the surge protector device SPD1 and the filter capacitor CF1 is also connected in parallel with the input terminal of the line filter LF1. An output terminal of the line filter LF1 is connected to an input terminal of a full-wave rectifier DB1 of the rectifier circuit 2. Thus, the filter circuit 1 is configured to remove power supply noise from the commercial power supply E1.

The rectifier circuit 2 includes the full-wave rectifier DB1 that is formed of a diode bridge. An output terminal of the full-wave rectifier DB1 is connected in parallel with a capacitor C1 for high frequency bypass. A negative electrode of the output terminal of the full-wave rectifier DB1 is ground on a circuit board, and is connected to ground (namely to a case (chassis electric potential) in which a circuit block is placed) in high frequency through a series circuit of capacitors (C2 and C3).

The boost chopper circuit 3 includes: an inductor L1; a switching device Q3 formed of a MOSFET; a diode D1; a smoothing capacitor C4; and a PFC control circuit IC1.

A series circuit of the inductor L1, the diode D1, and the smoothing capacitor C4 is connected between the positive and negative electrodes of the output terminal of the full-wave rectifier DB1. A series circuit, of the switching device Q3 and a current sensing resistor R1, is connected in parallel with a series circuit of the diode D1 and the smoothing capacitor C4. The smoothing capacitor C4 is a large-capacity capacitor such as an aluminum electrolytic capacitor or the like.

The boost chopper circuit 3 is configured to turn the switching device Q3 on and off at a high frequency to boost an undulating voltage from the full-wave rectifier DB1 and also to smooth the undulating voltage through the smoothing capacitor C4, thereby outputting a direct-current voltage V1 (e.g., 410V).

In the embodiment, the filter circuit 1, the rectifier circuit 2 and the boost chopper circuit 3 correspond to a direct-current power supply circuit of the present invention.

The PFC control circuit IC1 is formed of L6562A made by STMicroelectronics, and has first to eighth pins (P11-P18). The first pin P11 (INV) is an inversion input terminal of a built-in error amplifier (not shown). The second pin P12 (COMP) is an output terminal of the error amplifier. The third pin P13 (MULT) is an input terminal of a built-in multiplication circuit (not shown). The fourth pin P14 (CS) is a terminal for detecting a chopper current. The fifth pin P15 (ZCD) is a terminal for detecting zero cross. The sixth pin P16 (GND) is a ground terminal. The seventh pin P17 (GD) is a gate drive terminal. The eighth pin P18 (Vcc) is a power terminal.

A voltage across the capacitor C1 that is an input voltage of the boost chopper circuit 3 is an undulating voltage obtained by full wave rectification of an alternating-current voltage from the commercial power supply E1. The undulating voltage is divided with a resistor R5 and a series circuit of resistors (R2-R4), and noise is removed through a capacitor C5. The voltage (undulating voltage) across the capacitor C5 is applied to the third pin P13 of the PFC control circuit IC1. Thereby, the voltage (undulating voltage) across the capacitor C1 is detected with the PFC control circuit IC1. The built-in multiplication circuit connected to the third pin P13 is used for controlling so that waveform of an input current from the commercial power supply E1 through the full-wave rectifier DB1 becomes similar form to waveform of the undulating voltage.

A voltage across the smoothing capacitor C4 (the direct-current voltage V1) is divided with a series circuit of resistors (R6-R9), and a series circuit of a resistor R10 and a variable resistor VR1, and then applied to the first pin P11 of the PFC control circuit IC1. Therefore, the voltage across the smoothing capacitor C4 (the direct-current voltage V1) is detected with the PFC control circuit IC1. Capacitors (C6 and C7) and a resistor R11 connected between the first and second pins (P11 and P12) of the PFC control circuit IC1 constitute a feedback impedance of the built-in error amplifier.

A voltage across the current sensing resistor R1 is applied to the fourth pin P14 of the PFC control circuit IC1 through a noise filter circuit formed of a resistor R12 and a capacitor C8. Therefore, an electric current through the switching device Q3 is detected with the PFC control circuit IC1.

One end (a first end) of a secondary winding L2 of the inductor L1 is connected to the sixth pin P16 of the PFC control circuit IC1, namely to the circuit ground. The other end (a second end) of the secondary winding L2 is connected to the fifth pin P15 of the PFC control circuit IC1 through a resistor R13. Therefore, energy stored in the inductor L1 is detected with the PFC control circuit IC1.

If an output level of the seventh pin P17 (namely the gate drive terminal of the PFC control circuit IC1) becomes HIGH, an electric current flows through a resistor R15 through a resistor R14, and thereby a voltage across the resistor R15 increases. And then, the voltage across the resistor R15 becomes equal to or higher than a threshold voltage between the gate and source of the switching device Q3, the switching device Q3 is then turned on. On the other hand, if the output level of the seventh pin P17 becomes LOW, an electric charge stored between the gate and source of the switching device Q3 is discharged through a diode D2 and a resistor R16, and therefore the switching device Q3 is turned off.

The PFC control circuit IC1 also turns the switching device Q3 off if a value of an electric current through the switching device Q3, detected through the fourth pin P14, reaches a predetermined peak value. The PFC control circuit IC1 also turns the switching device Q3 on if energy stored in the inductor L1, detected through the fifth pin P15, is discharged and becomes lower than a threshold.

The PFC control circuit IC1 also controls so that an ON time of the switching device Q3 becomes long if an undulating voltage detected through the third pin P13 is high, while the ON time of the switching device Q3 becomes short if the undulating voltage is low.

The PFC control circuit IC1 further controls so that the ON time of the switching device Q3 becomes short if a value of the voltage across the smoothing capacitor C4 (direct-current voltage V1), detected through the first pin P11, is higher than a target value, while the ON time of the switching device Q3 becomes long if the value of the direct-current voltage V1 is lower than the target value. Thus, the PFC control circuit IC1 controls so that a value of a peak current through the switching device Q3 coincides with the target value.

The control power circuit 4 is formed of an IPD device IC2 connected to the smoothing capacitor C4, and a peripheral circuit. The IPD device IC2 is what is called an intelligent power device, and is formed of MIP2E2D made by Panasonic Corporation. The IPD device IC2 is a device having three pins of a drain terminal, a source terminal and a control terminal, and is provided therein with a switching device formed of a power MOSFET and a control circuit configured to control the ON and OFF of the switching device. The built-in switching device of the IPD device IC2, an inductor L3, a smoothing capacitor C9 and a diode D3 constitute a step-down chopper circuit. A zener diode ZD1, a diode D4, a smoothing capacitor C10 and a capacitor C11 constitute a power supply circuit for the IPD device IC2. A capacitor C12 for noise cut is connected to the drain terminal of the IPD device IC2.

The control power circuit 4 is configured to generate, across the smoothing capacitor C9, a control power voltage VC1 obtained by stepping down the voltage (the direct-current voltage V1) across the smoothing capacitor C4. The control power voltage VC1 is employed as an operational power supply for the PFC control circuit IC1, and aftermentioned integrated circuits (a 3-terminal regulator IC3, a microcomputer IC4, and a drive circuit IC5 of a driver IC). Therefore, the smoothing capacitor C9 is not charged before the IPD device IC2 is activated, and accordingly other integrated circuits (IC1 and IC3-IC5) are not activated either. An operation of the control power circuit 4 is hereinafter explained.

At the beginning after the electric power is supplied from the commercial power supply E1 to the lighting device 10, the smoothing capacitor C4 is charged by an output voltage of the full-wave rectifier DB1, and an electric current then flows through a path of the drain terminal of the IPD device IC2, the control terminal of the IPD device IC2, the smoothing capacitor C10, the inductor L3 and the smoothing capacitor C9. Accordingly, the smoothing capacitor C10 is charged and then supplies an operating voltage to the IPD device IC2. The IPD device IC2 is then activated, and starts ON and OFF control of the built-in switching device.

When the switching device of the IPD device IC2 is turned on, an electric current flows through a path of the smoothing capacitor C4, the drain terminal of the IPD device IC2, the source terminal of the IPD device IC2, the inductor L3 and the smoothing capacitor C9, and then the smoothing capacitor C9 is charged. And then, if the switching device of the IPD device IC2 is turned off, energy stored in the inductor L3 is discharged into the smoothing capacitor C9 through the diode D3. Accordingly, a circuit formed of the built-in switching device of the IPD device IC2, the inductor L3, the diode D3 and the smoothing capacitor C9 functions as a step-down chopper circuit. Consequently, the control power voltage VC1 obtained by stepping down the voltage (the direct-current voltage V1) across the smoothing capacitor C4 is generated across the smoothing capacitor C9.

When the switching device of the IPD device IC2 is turned off, regenerative energy (current) flows via the diode D3 and a voltage across the inductor L3 is clamped to a sum voltage (hereinafter referred to as "first sum voltage") of a voltage across the smoothing capacitor C9 and a forward voltage of the diode D3. A voltage across the smoothing capacitor C10 becomes a voltage obtained by subtracting a sum voltage ("second sum voltage") of a zener voltage across the zener diode ZD1 and a forward voltage of the diode D4 from the first sum voltage. The built-in control circuit of the IPD device IC2 performs ON and OFF control of the switching device so that the voltage across the smoothing capacitor C10 becomes constant. As a result, the voltage across the smoothing capacitor C9 is kept constant as well.

When the control power voltage VC1 is generated across the smoothing capacitor C9, the PFC control circuit IC1 is activated and the boost chopper circuit 3 is activated. In addition, the 3-terminal regulator IC3 for generating an operational power supply (5V) for the microcomputer IC4, as well as the microcomputer IC4 and the drive circuit IC5 are also activated. Accordingly, ON and OFF control of a switching device Q1 of the flyback converter circuit 5 is started.

The flyback converter circuit 5 includes: a transformer T1; the switching device (a first switching device) Q1 formed of a MOSFET; a diode D5; and a smoothing capacitor C13. The flyback converter circuit 5 is configured to variably control an ON pulse width (duration) of the switching device Q1, thereby generating, across the smoothing capacitor C13, a direct-current voltage obtained by stepping down the voltage (the direct-current voltage V1) across the smoothing capacitor C4.

A positive electrode of the smoothing capacitor C4 is connected to one end (a first end) of a primary winding N1 of the transformer T1, and a negative electrode of the smoothing capacitor C4 is connected to a source terminal of the switching device Q1. A drain terminal of the switching device Q1 is connected to the other end (a second end) of the primary winding N1. A series circuit, of resistors (R17 and R18) and a diode D8, is connected between both ends of the primary winding N1. A capacitor C14 is connected in parallel with the resistor R18.

The transformer T1 includes a first-secondary winding N2, a second-secondary winding N3 and a third-secondary winding N4. The polarity of each of the first- and second-secondary windings (N2, N3) is reversed to the primary winding N1 (additive polarity). The polarity of the third-secondary winding N4 is same with the primary winding N1 (reversed to the polarity of the first- and second-secondary windings (N2, N3)) (subtractive polarity). Winding number of the first-secondary winding N2 is substantially same with that of the primary winding N1. Winding number of each of the second- and third-secondary windings (N2, N3) is substantially one-tenth of that of the first-secondary winding N2.

A series circuit of the diode D5 and the smoothing capacitor C13 (e.g., 1 µF) is connected between both ends of the first-secondary winding N2 of the transformer T1. In detail, an anode terminal of the diode D5 is connected to one end (a first end) of the first-secondary winding N2, while a cathode terminal of the diode D5 is connected to the other end (a second end) of the first-secondary winding N2 through the smoothing capacitor C13. The light source unit 9 is connected in parallel with the smoothing capacitor C13 through an output terminal CN2.

When the switching device Q1 is driven (turned on and off), the direct-current voltage obtained by stepping down the direct-current voltage V1 is generated across the smoothing capacitor C13, and is applied to the light source unit 9. Thereby, a load current is supplied to the light source unit 9. It is possible to adjust an energy stored in the transformer T1 during an on-period of the switching device Q1 by means of variably controlling the on-period of the switching device Q1, therefore it can adjust the load current supplied to the light source unit 9.

That is, the first-secondary winding N2 of the transformer T1 is connected to the light source unit 9. The transformer T1 is adapted to supply the light source unit 9 with the load current from the first-secondary winding N2.

In short, the flyback converter circuit 5 (converter circuit) has the transformer T1 and the first switching device Q1. The transformer T1 has the primary winding N1 and the first- and second-secondary windings (N2, N3). The first- and second-secondary windings (N2, N3) are same polarity with each other. The first switching device Q1 is connected to the primary winding N1. The flyback converter circuit 5 is configured to be applied the power from the direct-current power supply circuit (1, 2, 3), and to supply the load current to the light source unit 9 from the first-secondary winding N2. The load current from the flyback converter circuit 5 is regulated by variable control of the ON width of the first switching device Q1.

The current regulation circuit 6 is connected to the second-secondary winding N3 through the diode D6. The current regulation circuit 6 includes a switching device (a second switching device) Q2 formed of a MOSFET and a photo-coupler 106.

The switching device Q2 is connected between both ends of the second-secondary winding N3 through the diode D6. The photo-coupler 106 is formed of TLP151 made by Toshiba Corporation and has first to sixth pins (P61-P66) except a second pin. The photo-coupler 106 is configured to turn the switching device Q2 on and off in accordance with a second control signal S2 from the microcomputer IC4 of the control unit 7. The photo-coupler 106 turns the switching device Q2 on and off with insulating the switching device Q2 from an output of the microcomputer IC4.

The first pin P61 of the photo-coupler 106 is an anode terminal of a built-in diode, and is connected to the microcomputer IC4 through a resistor R19 of, e.g., 2.7 kΩ. The third pin P63 is a cathode terminal of the built-in diode, and is connected to the circuit ground. The fourth pin P64 is a ground terminal and is connected to the other end (the second end) of the first-secondary winding N2 of the transformer T1. The fifth pin P65 is an output terminal. A series circuit, of a resistor R20 of, e.g., 100Ω and a resistor R21 of, e.g., 15 kΩ, is connected between the fourth and fifth pins (P64 and P65), and a junction of the resistors (R20 and R21) is connected to a gate terminal of the switching device Q2. The sixth pin P66 is a power terminal to which a power supply voltage of an induced voltage across the third-secondary winding N4 is applied.

A series circuit of a diode D7, a resistor R22 of, e.g., 100Ω and a capacitor C15 is connected between both ends of the third-secondary winding N4. A series circuit of a resistor R23 of, e.g., 100Ω and a capacitor C16 is connected in parallel with the capacitor C15. The sixth pin P66 is connected to a junction of the resistor R23 and the capacitor C16. The first winding N1 and the third-secondary winding N4 are formed in the same polarity (subtractive polarity), and the induced voltage is generated to the third-secondary winding N4 when the switching device Q1 is turned on. The induced voltage supplies an electric current to the capacitor C15 through the diode D7 and the resistor R22, thereby the capacitor C15 is charged. That is, a drive power of the photo-coupler 106 is generated by commutating and smoothing the induced voltage across the third-secondary winding N4 generated by driving (on and off) the switching device Q1.

In summary, when the second control signal S2 from the microcomputer IC4 is supplied to the first pin P61, the current regulation circuit 6 turns the switching device Q2 on and off in synchronization with a level of the second control signal S2.

As seen from FIG. 1, when the second switching device Q2 is turned off, an electric current can not flow through the second switching device Q2. Therefore, there is no energy consumption through the second-secondary winding N3.

On the other hand, when the second switching device Q2 is turned on, an electric current can flow through the second switching device Q2. Therefore, energy is dissipated (consumed) through the second-secondary winding N3. During this period, because a part of energy stored in the primary winding N1 is dissipated through the second-secondary winding N3, amount of energy which is supplied to the first-secondary winding N2 is decreased. Amount of energy consumed through the second-secondary winding N3 more increases as (accompany with) the increase of the ON width of the switching device Q2.

In short, the current regulation circuit 6 has the second switching device Q2 connected in series with the second-secondary winding N3. The current regulation circuit 6 is configured to decrease an energy supplied to the first-secondary winding N1 from the primary winding N1 so as to decrease the load current supplied (from the first-secondary winding N2) to the light source unit 9 in accordance with the increase of the ON width of the second switching device Q2.

The control unit 7 includes the microcomputer IC4, and is configured to produce a rectangular-wave signal (a first control signal S1) for turning on and off the switching device Q1 of the flyback converter circuit 5 and a rectangular-wave signal (the second control signal S2) for turning on and off the switching device Q2 of the current regulation circuit 6, in accordance with an internal program of the microcomputer IC4.

The microcomputer IC4 is formed of, e.g., 8 bit microcomputer 78K0/lx2 made by Renesas Electronics Corporation, and has first to thirtieth pins (P401-P430).

A power supply voltage of the microcomputer IC4 is, e.g., 5V, and accordingly the control power voltage VC1 of, e.g., 15V generated through the control power circuit 4 is converted into a power supply voltage for microcomputer VC2 of, e.g., 5V through the 3-terminal regulator IC3. An input terminal of the 3-terminal regulator IC3 is connected to a positive electrode of the smoothing capacitor C9, while an output terminal of the 3-terminal regulator IC3 is connected to the twenty-seventh pin P427 (a power terminal) of the microcomputer IC4. A capacitor C17 is connected between the input and ground terminals of the 3-terminal regulator IC3, and a capacitor C18 is connected between the output and ground terminals of the 3-terminal regulator IC3. The twenty-eighth pin P428 (a ground terminal) of the microcomputer IC4 is connected to ground. Thus, the 3-terminal regulator IC3 is configured to convert the voltage across the smoothing capacitor C9 (the control power voltage VC1) into the power supply voltage for microcomputer VC2 that is generated across the capacitor C18, thereby supplying power to the microcomputer IC4.

The twenty-second pin P422 of the microcomputer IC4 is connected to the external dimmer 8 through a connector CN3, and is supplied with a dimming signal Sd from the external dimmer 8. The dimming signal Sd is formed of a rectangular-wave signal having an amplitude of, e.g., 5V and an oscillating frequency of, e.g., 1 kHz. A target dimming ratio of the light source unit 9 is determined by an ON duty (on-period with respect to one cycle; duty ratio) Don1 of the dimming signal Sd. The target dimming ratio becomes a maximum ratio of, e.g., 100% (full lighting (power)) if the ON duty Don1 is 0%, and the target dimming ratio is set to be more decreased as the ON duty Don1 is more increased. By the program, the microcomputer IC4 is configured to read the ON duty Don1, namely ON pulse width of the dimming signal Sd, and control ON and OFF of the switching devices (Q1 and Q2) in accordance with the ON duty Don1.

The microcomputer IC4 is configured to output, from the nineteenth pin P419, the first control signal S1 for controlling ON and OFF of the switching device Q1 in accordance with the ON duty Don1 of the dimming signal Sd. Accordingly, the drive circuit IC5 turns the switching device Q1 on and off in accordance with the first control signal S1. The microcomputer IC4 is a general-purpose IC, and accordingly other operation is not explained in detail.

The drive circuit IC5 is formed of MAX15070A made by MAXIM corporation, and has first to sixth pins (P51-P56). The first pin P51 is a positive input terminal, and is connected to the nineteenth pin P419 of the microcomputer IC4 through a resistor R24 of, e.g., 1 kΩ and supplied with the first control signal S1. A junction of the resistor R24 and the nineteenth pin P419 is also connected to ground through a resistor R25 of, e.g., 100 kΩ. The second pin P52 is a ground terminal and connected to ground. The third pin P53 is a negative input terminal and connected to ground. The fourth pin P54 is an output terminal (a SYNC output terminal) of a built-in N-channel MOSFET, and connected to a gate terminal of the switching device Q1 through a resistor R26 of, e.g., 10Ω. The fifth pin P55 is an output terminal (a source output terminal) of a built-in P-channel MOSFET, and connected to the gate terminal of the switching device Q1 through a resistor R27 of, e.g., 300Ω. The gate terminal of the switching device Q1 is also connected to ground through a resistor R28. The sixth pin P56 is a power terminal, and is connected to the positive electrode of the smoothing capacitor C9 and also connected to ground through a capacitor C19 of, e.g., 0.1 µF. The sixth pin P56 is supplied with the control power voltage VC1 of, e.g., 15V.

The drive circuit IC5 amplifies the first control signal S1 having an amplitude of, e.g., 5V from the microcomputer IC4 so that the amplitude becomes, e.g., 15V, and supplies the amplified signal to the gate terminal of the switching device Q1, thereby turning the switching device Q1 on and off. The drive circuit IC5 is a general-purpose IC, and accordingly a concrete operation is not explained in detail.

The microcomputer IC4 is configured to output the second control signal S2 for controlling ON and OFF of the switching device Q2, from the seventeenth pin P417 to the first pin P61 of the photo-coupler 106 through the resistor R19, in accordance with the ON duty Don1 of the dimming signal Sd. A junction of the seventeenth pin P417 of the microcomputer IC4 and the resistor R19 is connected to ground through a resistor R29.

A peripheral circuit is connected to the microcomputer IC4 according to usage environment. In the embodiment, the twelfth pin P412 is connected to the output terminal of the 3-terminal regulator IC3. The seventh, eighth and ninth pins (P407, P408 and P409) are connected to the output terminal of the 3-terminal regulator IC3 through resistors (R30, R31 and R32), respectively. The tenth pin P410 is connected to ground through a capacitor C20.

Figure 2:
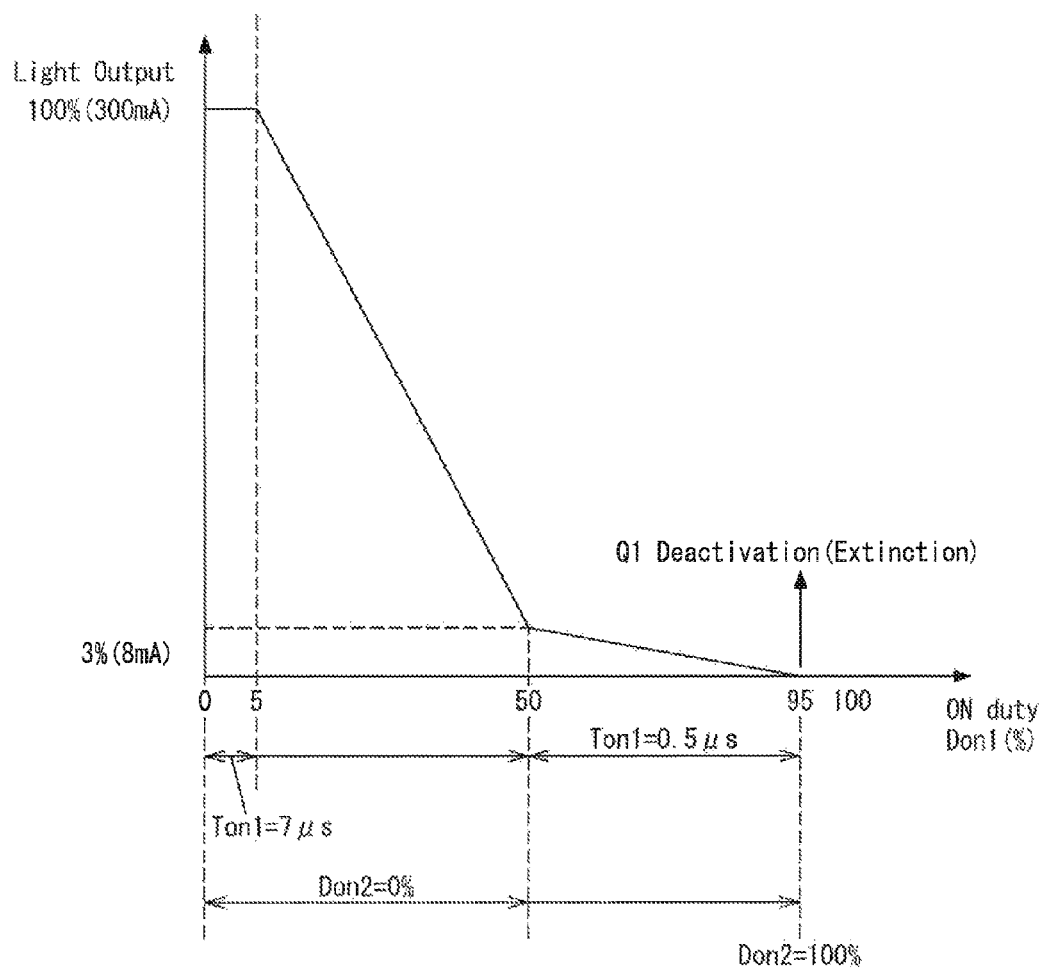
FIG. 2 is a graph showing a relationship between ON duty of a dimming signal and light output according to the first embodiment.

An operation of the lighting device 10 in the embodiment is next explained with FIG. 2. FIG. 2 is a graph showing a light output (a dimming ratio) of the light source unit 9 and an effective value of the load current through the light source unit 9 with respect to the ON duty Don1 of the dimming signal Sd.

As shown in FIG. 2, the target dimming ratio of the light source unit 9 is set to a maximum ratio of, e.g., 100% (a load current of 300 mA), if the ON duty Don1 of the dimming signal Sd is in a first range (e.g., 0-5%). The target dimming ratio is also set: to more decrease as the ON duty Don1 is more increased from an upper limit of the first range (e.g., 5%) if the ON duty Don1 is in a second range (e.g., 5-50%); and to be a first ratio of, e.g., 3% (a load current of 8 mA) if the ON duty Don1 reaches an upper limit of the second range (e.g., 50%). The target dimming ratio is further set: to more decrease at a more gradual rate than that in the second range as the ON duty Don1 is more increased if the ON duty Don1 is in a third range (e.g., 50-95%); and to be a minimum ratio of, e.g., 0% (extinction) if the ON duty Don1 reaches an upper limit of the third range (e.g. 95%). An operation for realizing such dimming control is hereinafter explained. The first ratio (e.g., 3%) in the embodiment is lower than the maximum ratio and higher than the minimum ratio, and corresponds to a first ratio of the present invention.

Note that, in the embodiment, a range between the maximum ratio (e.g. 100%) and the first ratio (e.g. 3%) (i.e. a range in which the dimming ratio of the light source unit 9 is higher than the first ratio) is defined as a "first dimming range". A range between the first ratio (e.g. 3%) and the minimum ratio (e.g. 0%) (i.e. a range in which the dimming ratio of the light source unit 9 is lower than the first ratio) is defined as a "second dimming range".

Figure 3:
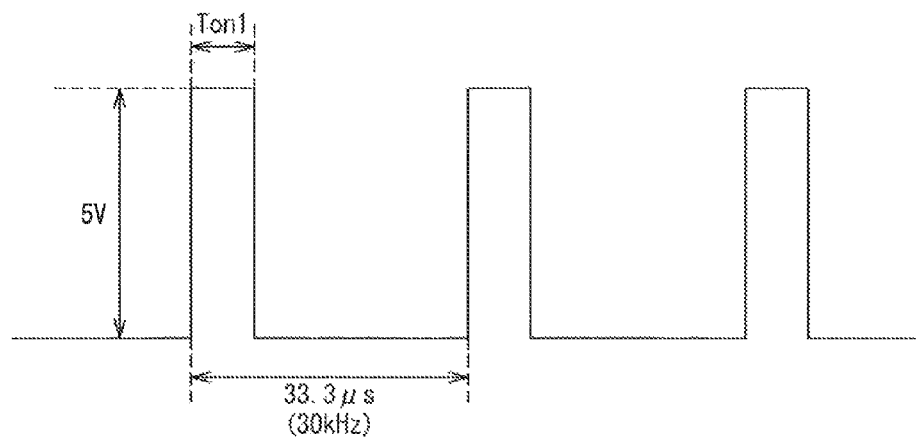
FIG. 3 illustrates a waveform of a first control signal according to the first embodiment.

The dimming signal Sd is supplied to the twenty-second pin P422 of the microcomputer IC4 through the connector CN3, and the microcomputer IC4 detects the ON duty Don1 (the ON pulse width) of the dimming signal Sd. Based on the ON duty Don1, the microcomputer IC4 decides an ON pulse width Ton1 (an ON width) of the first control signal S1 and an ON duty Don2 of the second control signal S2. As shown in FIG. 3, the first control signal S1 is formed of a rectangular-wave signal having an (first) oscillating frequency of, e.g., 30 kHz (a period of 33.3 µs) and an amplitude (a voltage value) of, e.g., 5V.

The microcomputer IC4 sets the ON pulse width Ton1 of the first control signal S1 to, e.g., 7 µs (at constant) if the ON duty Don1 of the dimming signal Sd is in 0-5%. The microcomputer IC4 sets the ON duty Don2 of the second control signal S2 to 0% to (turn or) keep the switching device Q2 turned off if the ON duty Don1 of the dimming signal Sd is in 0-50%.

The first control signal S1 is supplied to the drive circuit IC5 that amplifies the first control signal S1 so that an amplitude of the signal S1 becomes, e.g., 15V, and supplies the amplified signal S1 to the gate of the switching device Q1 in the flyback converter circuit 5. The switching device Q1 is accordingly turned on and off in synchronization with a level of the first control signal S1. The lighting device 10 is configured so that the load current flowing through the light source unit 9 is 300 mA when the ON pulse width Ton1 of the first control signal S1 is 7 µs, and the light source unit 9 is in full lighting state (namely, driven at full power or rated power).

An operation if the ON duty Don1 of the dimming signal Sd is in 5-50% is next explained. The microcomputer IC4 more decreases the ON pulse width Ton1 of the first control signal S1 from 7 µs as an ON duty Don1 of the dimming signal Sd is more increased than 5%, and sets the ON pulse width Ton1 of the first control signal S1 to, e.g., 0.5 µs (a lower limit) when the ON duty Don1 of the dimming signal Sd is 50%. Accordingly, an on-period of the switching device Q1 is more decreased as the ON duty Don1 of the dimming signal Sd is more increased than 5%, therefore the energy stored in the transformer T1 is more decreased, and the load current supplied to the light source unit 9 is also more decreased. The lighting device 10 is configured so that the load current is 8 mA when the ON pulse width Ton1 of the first control signal S1 is 0.5 µs (in other words, the on-period of the switching device Q1 is 0.5 µs).

In short, the control unit 7 is configured, in a range where the dimming ratio of the light source unit 9 is higher than the first ratio (e.g. 3%) (i.e. in the first dimming range), to regulate the ON width of the first switching device Q1 with the second switching device Q2 kept off, thereby control the dimming ratio of the light source unit 9.

That is, the control unit 7 is configured: in order to increase the dimming ratio of the light source unit 9 in a range where the dimming ratio of the light source unit 9 is higher than the first ratio (e.g. 3%), to increase the ON width of the first switching device Q1 with the second switching device Q2 kept off; and in order to decrease the dimming ratio of the light source unit 9 in a range where the dimming ratio of the light source unit 9 is higher than the first ratio (e.g. 3%), to decrease the ON width of the first switching device Q1 with the second switching device Q2 kept off.

In this instance, a high-frequency (corresponding to a switching frequency of the switching device Q1) electric current of 30 kHz flows through the first-secondary winding N2 of the transformer T1, but the current is smoothed with the capacitor C13. Accordingly, the load current through the light source unit 9 becomes a direct current almost without ripple, and thus does not interfere with video cameras. This advantage can be obtained if capacity of the capacitor C13 is 1 μF or more.

An operation if the ON duty Don1 of the dimming signal Sd is 50% or more (that is, the dimming ratio of the light source unit 9 is lower than the first ratio) is next explained. The microcomputer IC4 more increases the ON duty Don2 of the second control signal S2 as the ON duty Don1 of the dimming signal Sd is more increased than 50%, with keeping the ON pulse width Ton1 of the first control signal S1 at 0.5 μs.

That is, the control unit 7 is configured, in a range where the dimming ratio of the light source unit 9 is lower than the first ratio (e.g. 3%) (i.e. in the second dimming range), to regulate the ON width of the second switching device Q2 with the ON width of the first switching device Q1 held at the lower limit (e.g. 0.5 μs), thereby controlling the dimming ratio of the light source unit 9.

The second control signal S2 is formed of a rectangular-wave signal having an (second) oscillating frequency of, e.g., 5 kHz that is lower than that of the first control signal S1. The microcomputer IC4 decomposes one period (cycle) of the second control signal S2 into 1000 steps (1 step=200 ns) and controls the ON duty Don2 of the second control signal S2 at intervals of 200 ns.

When the switching device Q2 is turned on to conduct an electric path between both ends of the second-secondary winding N3, an electric current (a drain current) flows from the second-secondary winding N3 into the switching device Q2 through the diode D6. FIG. 4A is a waveform diagram of a measured drain current of the switching device Q2, and FIG. 4B is a waveform diagram of a measured gate voltage of the switching device Q2.

Figure 4:
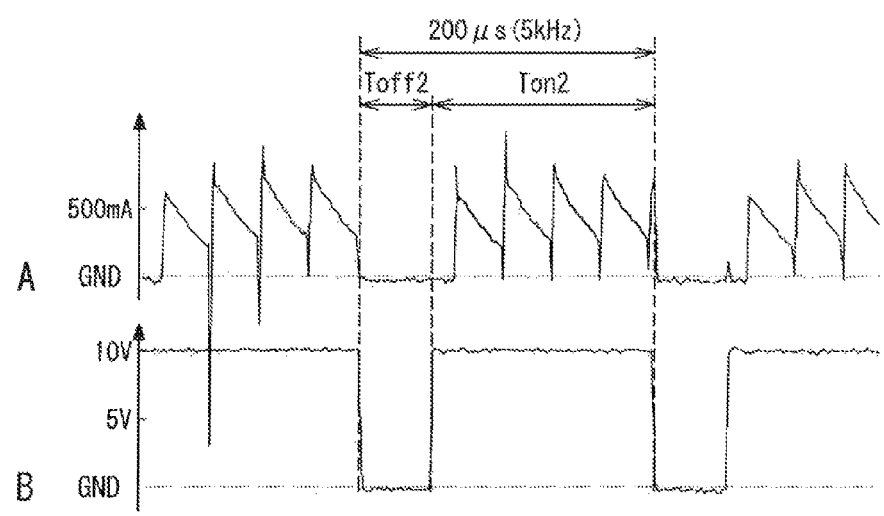

A voltage is produced across the second-secondary winding N3 by the energy stored in the transformer T1 during the on-period of the switching device Q1. During an off-period Toff2 of the switching device Q2, because the path between both ends of the second-secondary winding N3 is electrically insulated, the drain current of the switching device Q2 becomes zero (an electric current does not flow through the switching device Q2), as shown in FIG. 4. Therefore, during the off-period Toff2 of the switching device Q2, the energy stored in the transformer T1 is not consumed through the second-secondary winding N3. That is, during the periods in which the switching device Q2 is turned off, all of the energy stored in the transformer T1 is supplied to the first-secondary winding N2 to be supplied to the light source unit 9 as the load current.

On the contrary, during an on-period Ton2 of the switching device Q2, because the path between both ends of the second-secondary winding N3 is conducted, the electric current (the drain current) caused by the energy stored in the transformer T1 is supplied from the second-secondary winding N3 to the switching device Q2 through the diode D6. During the on-period Ton2 of the switching device Q2, the drain current flows through the switching device Q2 at the switching frequency of the switching device Q1 of, e.g., 30 kHz, as shown in FIG. 4A. Therefore, during the on-period Ton2 of the switching device Q2, a part of the energy stored in the transformer T1 is dissipated (consumed) through the second-secondary winding N3. In this instance, the energy consumed through the second-secondary N3 is more increased as the on-period Ton2 of the switching device Q2 is more increased (i.e. the ON duty Don2 of the second control signal S2 is more increased).

That is, during the on-period Ton2 of the switching device Q2, the energy stored in the transformer T1 is consumed through both of the first- and second-secondary windings (N2 and N3). As described above, the second switching device Q2 is driven (turned on and off) only when the ON duty Don1 of the dimming signal Sd is 50% or more (i.e. in a range where the dimming ratio of the light source unit 9 is lower than the first ratio of. e.g. 3%). In this range, because the on-period of the switching device Q1 is kept at constant of 0.5 μs, and therefore the energy stored in the transformer T1 becomes constant. As a result, the energy consumed through the second-secondary N3 is more increased and therefore the energy supplied to the first-secondary winding N2 from the primary winding N1 of the transformer T1 is more decreased as the increase of the on-period Ton2 of the switching device Q2.

In summary, the load current supplied to the light source unit 9 is more decreased as the increase of the on-period Ton2 of the switching device Q2. FIGS. 4A, 4B show a case in which the ON duty of the switching device Q2 (the ON duty Don2 of the second control signal S2) is about 76%. In this case, the measured load current supplied to the light source unit 9 is about 3 mA.

The microcomputer IC4 is configured to set the ON duty Don2 of the second control signal S2 to 100% if the ON duty Don1 of the dimming signal Sd is 95%. In the embodiment, if the ON duty Don1 of the dimming signal Sd becomes 95% or more, the microcomputer IC4 sets the first control signal S1 to a low-level and deactivates the flyback converter circuit 5, thereby turning the light source unit 9 off.

Figure 5:
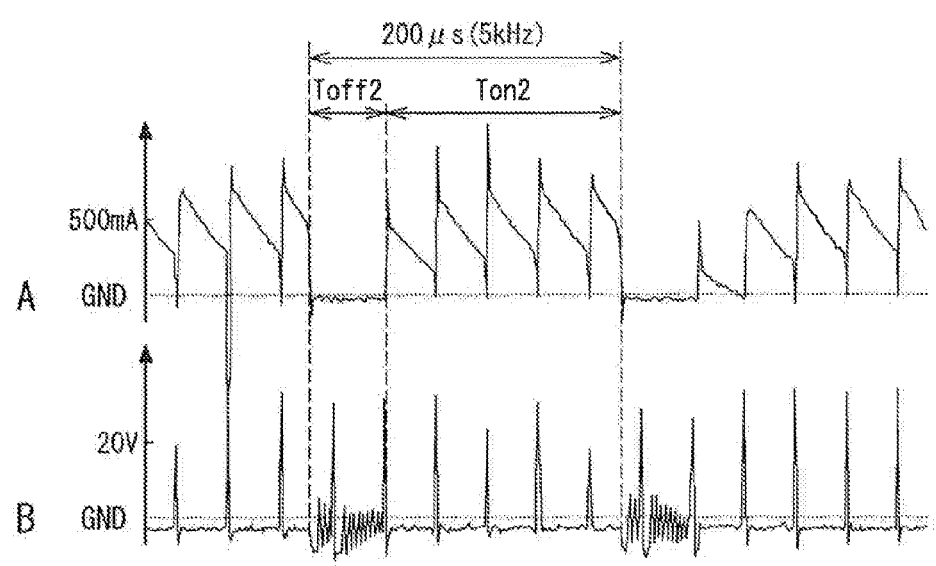

In the embodiment, the drive power of the current regulation circuit 6 (the drive power of the photo-coupler 106) is obtained by commutating and smoothing the voltage generated across the third-secondary winding N4. FIG. 5A is a waveform diagram of the measured drain current of the switching device Q2, and FIG. 5B is a waveform diagram of a measured output voltage of the third-secondary winding N4. In this instance, the third-secondary winding N4 is arranged so as to be the same polarity with the primary winding N1 (reversed polarity to the first- and second-secondary windings (N2 and N3)). Therefore, when the switching device Q1 is turned on, the induced voltage is generated across the third-secondary winding N4. The drive power of the photo-coupler 106 is obtained by commutating and smoothing, by the diode D7, the resistor R22 and the capacitor C15, the induced voltage generated across the third-secondary winding N4. Therefore, it is possible to generate the drive power of the current regulation circuit 6 even when the load current supplied to the light source unit 9 is relatively small (the dimming ratio is relatively low).

Because the third-secondary winding N4 is arranged to be the same polarity with the primary winding N1 (subtractive polarity), the third-secondary winding N4 does not consume the energy stored in the transformer T1 during the period in which the switching device Q1 is turned off. In other words, the third-secondary winding N4 does not reduce the load current supplied from the first-secondary winding N2 to the light source unit 9. Therefore, it is possible to enhance the precision of the dimming control of the light source unit 9. It is effective particularly in a range where the load current is relatively small and the dimming ratio is relatively low.

As described above, when the switching device Q2 is turned on, the energy supplied to the first-secondary winding N2 is decreased by the shunt (by moving to a path of the switching device Q2), and therefore the load current supplied from the first-secondary winding N2 to the light source unit 9 is decreased. It is therefore possible to variably control the load current by controlling the ON duty of the switching device Q2. Accordingly, the ON duty Don2 of the second control signal S2 (the ON duty of the switching device Q2) is increased so as to decrease the load current through the light source unit 9, and thereby the dimming ratio of the light source unit 9 can be further decreased less than 3% (a load current of 8 mA).

In the embodiment, the switching frequency of the switching device Q1 is always kept at constant value of, e.g., 30 kHz. Therefore, even when a comparatively small load current (e.g., a load current of 8 mA or less) flows through the light source unit 9, it is possible to stabilize the lighting state of the each of the light emitting diodes LD1 in the light source unit 9 by the output voltage of the transformer T1, and dispersion in brightness among them is suppressed.

There is no extreme change in brightness even though the switching device Q2 starts to be turned on and off, and an accurate dimming control is subsequently possible, because the microcomputer IC4 controls the ON duty of the switching device Q2 at constant intervals shorter than one period of the second control signal S2 (e.g., at intervals of 200 ns). In the embodiment, the ON duty of the switching device Q2 is controlled at a rate of 200 ns, but the embodiment is not limited to such a rate. Each step can be changed by the program for the microcomputer IC4, and accordingly a desired dimming curve can be obtained. In the embodiment, since the microcomputer IC4 controls ON and OFF of the switching devices (Q1 and Q2), it is possible to easily change settings of ON and OFF of the switching devices (Q1 and Q2) by changing only settings in the program.

In the embodiment, the oscillating frequency of the second control signal S2 for controlling ON and OFF of the switching device Q2 is set to 5 kHz higher than that corresponding to a shutter speed of video equipment such as a video camera. Therefore, even if a load current having ripples is supplied to the light source unit 9, it is possible to suppress the interference with the video camera. In confirmatory experiment, no flicker or the like occurred in video shoot even if a shutter speed of a video camera is 1/8000 of a second.

Conventionally, there is a problem that a transformer buzzing noise occurs if a converter circuit is intermittently driven at a few kHz, in order to prevent the interference with video cameras. In the embodiment, the problem can be solved because the flyback converter circuit 5 continuously operates even when luminous flux with respect to the light source unit 9 is low (i.e. even in a range where the dimming ratio is comparatively low).

In the embodiment, the dimming signal Sd is a rectangular-wave signal, but the embodiment is not limited to this. For example, the embodiment may be configured so that the dimming signal Sd is formed of a direct-current voltage of which voltage value is changed in accordance with a target dimming signal, and the microcomputer IC4 reads the change of the voltage value. The embodiment may be also configured so that an infrared receiving device is provided and a dimming control is performed by an infrared signal.

(Second Embodiment)

Figure 6:
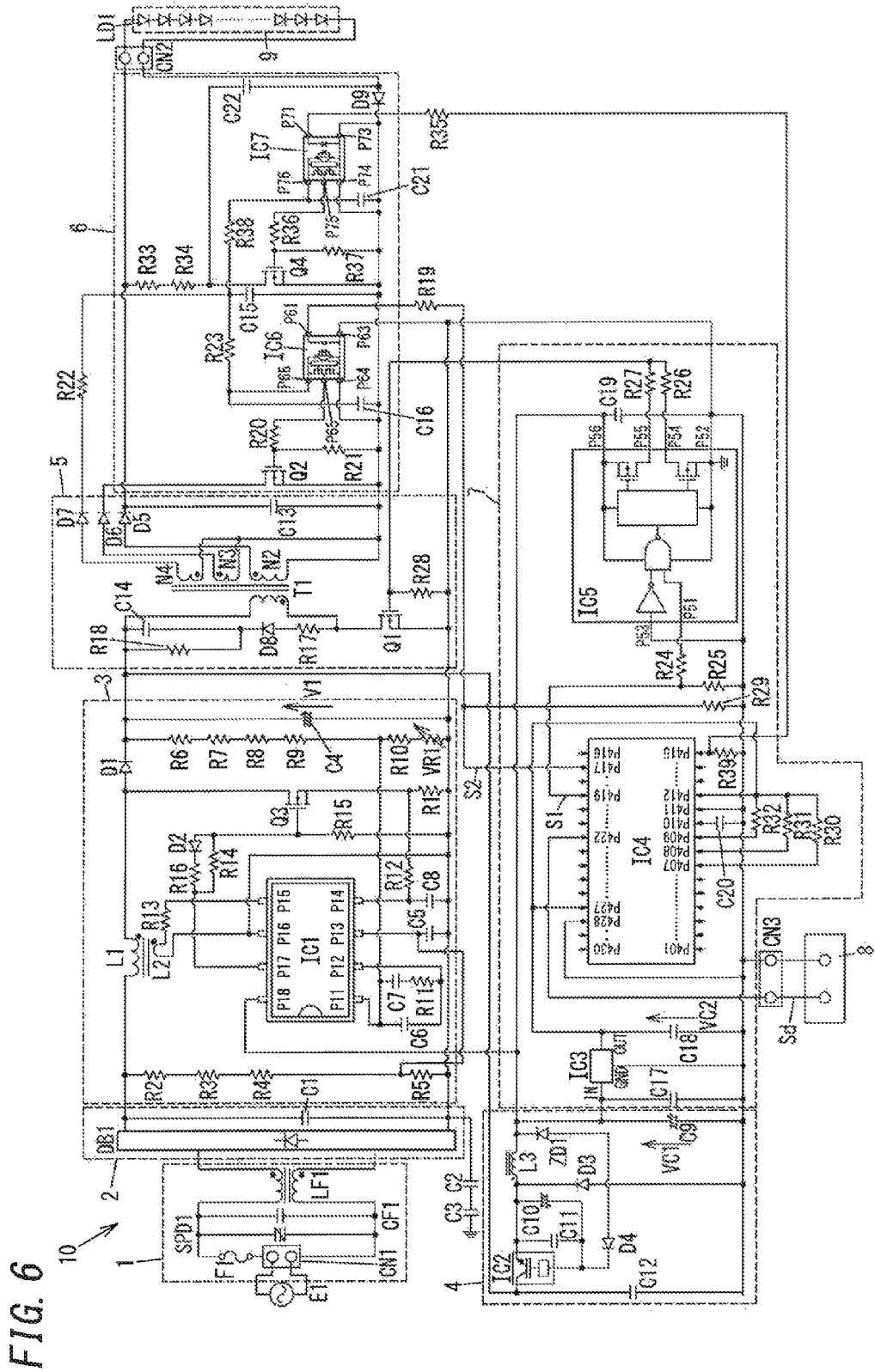
FIG. 6 is a circuit diagram of a semiconductor light emitting element drive device according to a second embodiment of the present invention.

FIG. 6 shows a circuit diagram of a lighting device 10 according to a second embodiment of the present invention. Like kind elements are assigned the same reference numerals as depicted in the first embodiment, and are not explained in detail.

In the embodiment, a current regulation circuit 6 shares a first-secondary winding N2 (an inductor) of a transformer T1 with a flyback converter circuit 5, and the following configuration is added to the current regulation circuit 6.

The current regulation circuit 6 further includes a switching device (a third switching device) Q4, resistors (R33-R38), a photo-coupler IC7, capacitors (C21 and C22), and a diode D9. A series circuit, of the resistors (R33 and R34) as an impedance component and the switching device Q4, is connected in parallel with the smoothing capacitor C13.

The photo-coupler IC7 has first to sixth pins (P71-P76) other than a second pin, and is configured to turn the switching device Q4 on and off in accordance with a third control signal S3 supplied from the microcomputer IC4. That is, the photo-coupler IC7 turns the switching device Q4 on and off with insulating the switching device Q4 from an output of the microcomputer IC4. The first pin P71 is an anode terminal of a built-in diode, and connected to the fifteenth pin P415 of the microcomputer IC4 through the resistor R35. The third pin P73 is a cathode terminal of the built-in diode, and connected to the other end (the second end) of the first-secondary winding N2 of the transformer T1. The fourth pin P74 is a ground terminal, and connected to the other end (the second end) of the first-secondary winding N2 of the transformer T1. The fifth pin P75 is an output terminal. A series circuit of the resistor R36 of, e.g., 100Ω and the resistor R37 of, e.g., 15 kΩ is connected between the fourth and fifth pins (P74 and P75), and a junction of the resistors (R36 and R37) is connected to a gate terminal of the switching device Q4. The sixth pin P76 is a power terminal, and obtains a power supply voltage though the third-secondary winding N4 of the transformer T1. A series circuit of the resistor R38 of, e.g., 100Ω and the capacitor C21 is connected in parallel with the capacitor C15, and the sixth pin P76 is connected to a junction of the resistor R38 and the capacitor C21. A drive power of the photo-coupler IC7 is generated by commutating and smoothing the induced voltage generated across the third-secondary winding N4. A series circuit of the capacitor C22 and the diode D9 is connected between drain and source of the switching device Q4, and the cathode of the diode D9 is connected to the source of the switching device Q4 and the other end (the second end) of the first-secondary winding N2 of the transformer T1.

The fifteenth pin P415 of the microcomputer IC4 is connected to ground through the resistor R39, and the microcomputer IC4 is configured to supply the third control signal S3 from the fifteenth pin P415 to the photo-coupler IC7, thereby controlling ON and OFF of the switching device Q4.

Figure 7:
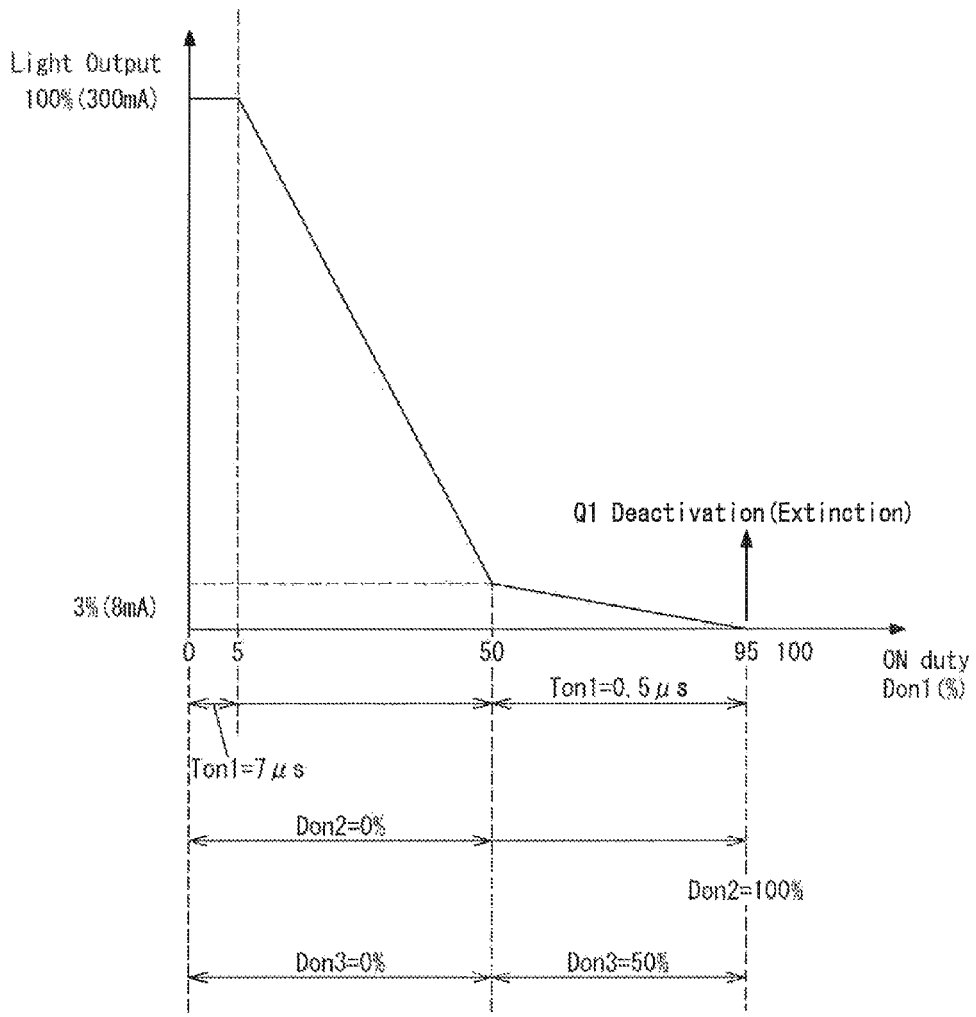
FIG. 7 is a graph showing a relationship between ON duty of a dimming signal and light output according to the second embodiment.

An operation of the lighting device 10 in the embodiment is next explained with reference to FIGS. 7, 8A and 8B. The first and second control signals (S1 and S2) supplied from the microcomputer IC4 are the same as those of the first embodiment, and accordingly are not explained in detail.

The microcomputer IC4 sets an ON duty Don3 of the third control signal S3 to, e.g., 0% if the ON duty Don1 of the dimming signal Sd is in 0-50%, and the switching device Q4 is (turned or) kept off. If the ON duty Don1 of the dimming signal Sd is more increased than 50% (that is, in a range where the dimming ratio of the light source unit 9 is lower than a second ratio (e.g. 3%)), the microcomputer IC4 sets the third control signal S3 so that an (third) oscillating frequency of the signal S3 becomes, e.g., 120 Hz (which is lower than the second oscillating frequency) and the ON duty Don3 of the signal S3 becomes, e.g., 50%, thereby controlling ON and OFF of the switching device Q4. That is, the control unit 7 is configured: to keep the switching device Q4 off in a range where the dimming ratio of the light source unit 9 is higher than the second ratio (e.g. 3%); and to control ON and OFF of the switching device Q4 in a range where the dimming ratio of the light source unit 9 is lower than the second ratio. In the embodiment, the second ratio is set to be equal to the first ratio (e.g. 3%).

Note that, in the embodiment, a range between the maximum ratio (e.g. 100%) and the second ratio (e.g. 3%) (i.e. a range in which the dimming ratio of the light source unit 9 is higher than the second ratio) is defined as a "third dimming range". A range between the second ratio (e.g. 3%) and the minimum ratio (e.g. 0%) (i.e. a range in which the dimming ratio of the light source unit 9 is lower than the second ratio) is defined as a "fourth dimming range".

When the switching device Q4 is tuned off, an electric current flows through a path of the resistor R33, the resistor R34 and the capacitor C22, and the capacitor C22 is charged. And then, if a level of the third control signal S3 is inverted and the switching device Q4 is turned on from the OFF state, the capacitor C22 is discharged. Accordingly, an electric current flows through the first-secondary winding N2 (the inductor) of the transformer T1 through the switching device Q4 from the capacitor C22, and thereby induced power generates at the first-secondary winding N2 and a pulse voltage is superposed on a voltage across the capacitor C13. Note that, the capacitor C22 may have a small capacity (e.g., pF order) such that a pulse voltage can be applied when the switching device Q4 is turned on from the OFF state.

Figure 8:
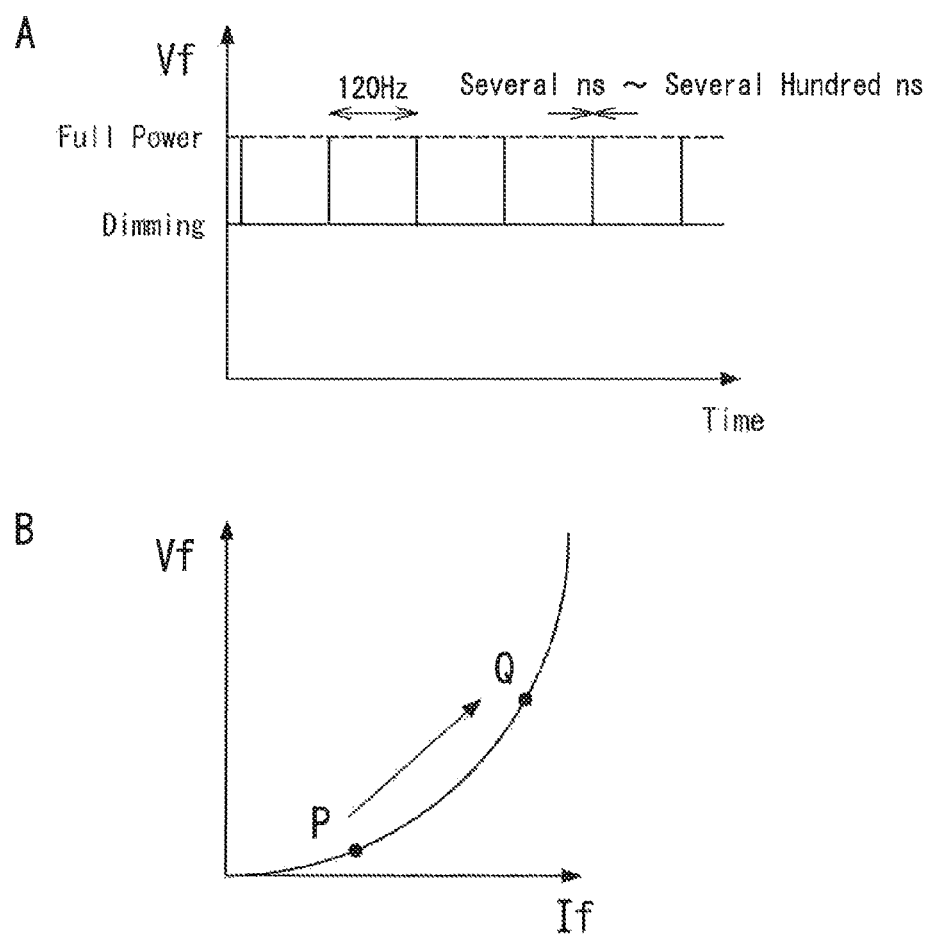

As shown in FIG. 8A, a forward voltage Vf applied to the light source unit 9 has a waveform in which the pulse voltage of approximately several ns to several hundred ns is superposed on the voltage across the capacitor C13 during dimming by discharge of the capacitor C22 with a period of 120 Hz.

That is, in the embodiment, the current regulation circuit 6 includes: the series circuit, of the resistors (R33, R34) and the capacitor C22, connected in parallel with the light source unit 9; the third switching device Q4 adapted to discharge the capacitor C22 when the third switching device Q4 is turned on; and the first-secondary winding N2 (inductor) placed along a discharge path of the capacitor C22. In the range where the dimming ratio of the light source unit 9 is lower than the second ratio (e.g. 3%), a pulse voltage derived from the induced power of the first-secondary winding N2 (inductor) generated when the third switching device Q4 discharges the capacitor C22 is superposed on the output of the flyback converter circuit 5 (converter circuit).

Accordingly, as shown in FIG. 8B, the forward voltage Vf applied to the light source unit 9 can be periodically shifted from an operating point P to an operating point Q, wherein in the operating point P, a small forward current If flows through the light source unit 9 and the light output has large dispersion in brightness, while in the operating point Q, a large forward current If flows through the light source unit 9 and the light output has small dispersion in brightness. Accordingly, in the embodiment, it is possible to further suppress dispersion in brightness with respect to each light emitting diode LD1 of the light source unit 9 when the dimming ratio is 3% or less (low luminous flux in case of a load current of 8 mA or less). Larger advantage can be obtained as ON and OFF frequency of the switching device Q4 is lower. In the embodiment, the oscillating frequency of the third control signal S3 is set to 120 Hz in order to avoid invisible flicker to human eyes, but may be set to more than 120 Hz.

In the embodiment, the switching device Q4 starts to be turned on and off at the same timing as a timing at which the switching device Q2 starts to be turned on and off (a dimming ratio of 3% or less (a load current of 8 mA or less)) (that is, in the embodiment, the first ratio is same with the second ratio), but the embodiment is not limited to this. That is, the aforementioned advantage can be obtained, by starting to turn the switching device Q4 on and off before the light emitting diodes LD1 each have dispersion in brightness, in an operation of turning the light source unit 9 on up to extremely low luminous flux that a load current through the unit 9 becomes 200 µA or less. That is, the second ratio may be set to smaller than the first ratio. The second ratio is preferably set to a value which is slightly larger than a value at which the light emitting diodes LD1 have dispersion in brightness. A timing at which the switching device Q4 starts to be turned on and off is controlled through the microcomputer IC4, and accordingly can be easily changed by the program.

(Third Embodiment)

Figure 9:
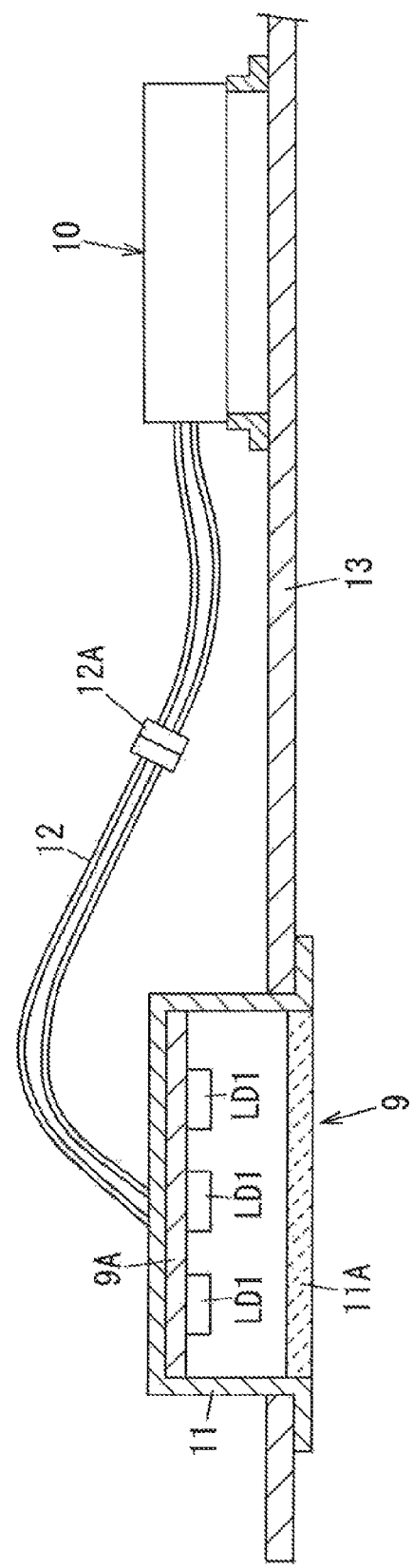
FIG. 9 is a schematic structure diagram of a lighting fixture according to a third embodiment of the present invention.
Figure 10:
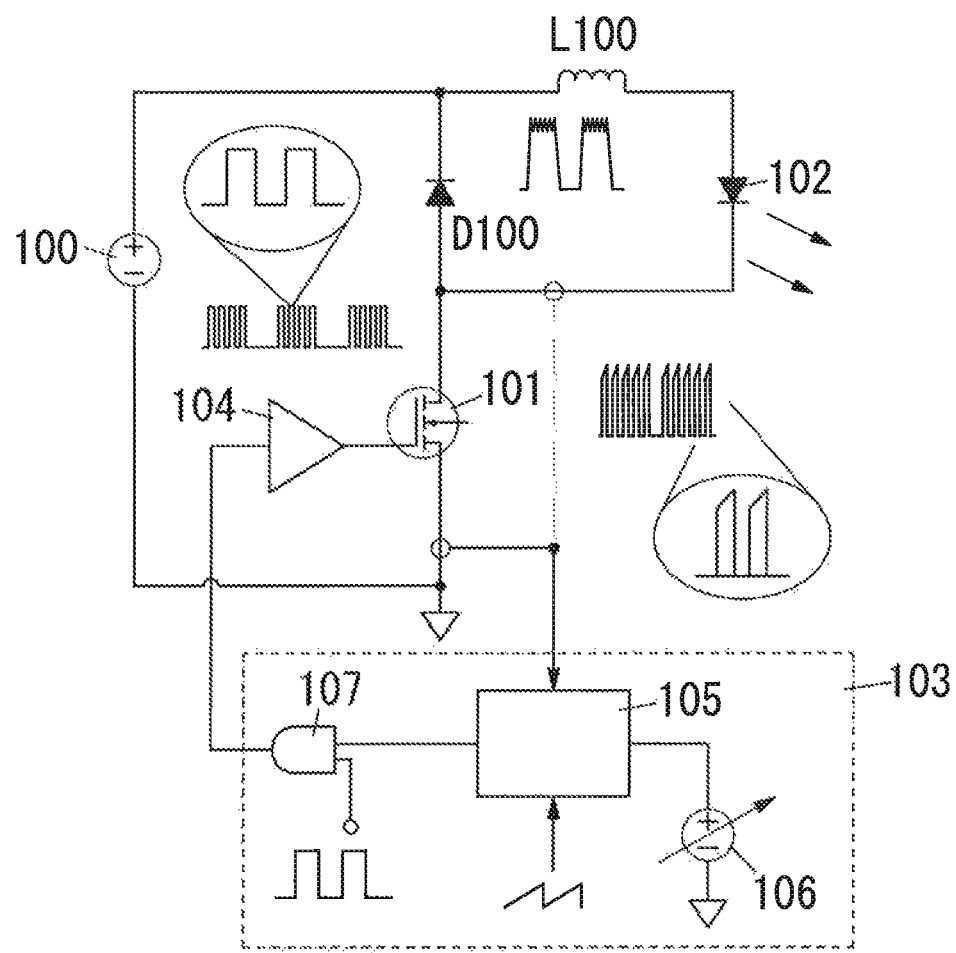
FIG. 10 is a circuit diagram of a conventional lighting device.

FIG. 9 shows a schematic diagram of a lighting fixture in accordance with an embodiment of the present invention. The lighting device 10 in first or second embodiment is employed as a lighting device 10 in the present embodiment. As shown in FIG. 9, the lighting fixture in the embodiment is a separate power supply type that a direct-current power supply and the lighting device 10 are placed separately from a light source unit 9. A fixture body 11 in which the light source unit 9 is placed is buried in a ceiling 13. Accordingly, the fixture body 11 including the light source unit 9 can be made thin in appearance, and the lighting device 10 as a power supply unit placed separately from the light source unit 9 can be located without limitation of installation place.

The fixture body 11 is made of metal such as, aluminum die-casting, and is made in the shape like a cylinder having an upper base and a lower opening. The light source unit 9 includes a substrate 9A mounted on an inner face of the upper base of the fixture body 11, and a plurality of (in the figure, three) light emitting diodes LD1 mounted on a lower surface of the substrate 9A. Each illumination axis of the light emitting diodes LD1 is aimed downward so that its own light is irradiated from the lower end of the fixture body 11 to an exterior space. A translucent board 11A for diffusing light from each light emitting diode LD1 is provided at the lower opening of the fixture body 11. The lighting device 10 is located at a different place from the fixture body 11 above the ceiling 13 (specifically, a back side (an upper surface) of the ceiling 13), and electrically connected to the light source unit 9 through a connector 12A and lead wires.

In the embodiment, the lighting device 10 that is the same as that in first or second embodiment is employed, and accordingly an advantage that is the same as that in first or second embodiment can be obtained. In the embodiment, the lighting fixture is the separate power supply type that the power supply and the lighting device 10 are placed separately from the light source unit 9, but may be an all-in-one type that the lighting device 10 is built in the fixture body 11 along with the light source unit 9.

Each lighting device 10 in the aforementioned embodiments is not limited to the aforementioned lighting fixture (such as one described in the third embodiment). For example, such a lighting device 10 may be employed as a drive device for a backlight of a liquid crystal display, or a light source of a device such as a copy machine, a scanner, a projector or the like. In the aforementioned embodiments, each light emitting element of the light source unit 9 is a light emitting diode (LD), but no limited to this. For example, organic EL devices or semiconductor laser devices may be employed as the light emitting elements of the light source unit 9. In addition, each switching device is not limited to a MOSFET. A bipolar transistor to which a diode is connected in inverse-parallel, an insulated gate bipolar transistor (IGBT) or the like may be employed as such a switching device.

The invention claimed is:

1. A semiconductor light emitting element drive device, comprising:
   a direct-current power supply circuit configured to output direct-current power;
   a converter circuit which has a transformer and a first switching device, said transformer having a primary winding and first- and second-secondary windings, said first- and second-secondary windings being same polarity with each other, and said first switching device being connected to said primary winding, wherein said converter circuit being configured to be input the power outputted from said direct-current power supply circuit and to supply a load current to a light source unit comprising light emitting elements from said first-secondary winding, said converter circuit being configured to control the load current by variably controlling an ON width of said first switching device;
   a current regulation circuit which has a second switching device connected in series with said second-secondary winding, said current regulation circuit being configured to decrease an energy supplied to said first-secondary winding from said primary winding so as to decrease the load current supplied to said light source unit as the increase of an ON width of said second switching device; and
   a control unit configured to control ON and OFF of said first and second switching devices,
   wherein said control unit is configured,
   (a-1) if increasing a dimming ratio of said light source unit in a range where the dimming ratio of said light source unit is higher than a first ratio, to increase the ON width of said first switching device with said second switching device kept off,
   (a-2) if decreasing the dimming ratio of said light source unit in a range where the dimming ratio of said light source unit is higher than the first ratio, to decrease the ON width of said first switching device with said second switching device kept off, and
   (b) in a range where the dimming ratio of said light source unit is lower than the first ratio, to regulate the ON width of said second switching device with the ON width of said first switching device held at a lower limit,
   thereby controlling the dimming ratio of said light source unit.

2. The semiconductor light emitting element drive device as set forth in claim 1,
   wherein said current regulation circuit comprises:
   a series circuit, of an impedance component and a capacitor, connected in parallel with said light source unit;
   a third switching device adapted to discharge said capacitor when said third switching device is turned on; and
   an inductor placed along a discharge path of said capacitor,
   wherein, in a range where the dimming ratio of said light source unit is lower than a second ratio, a pulse voltage, derived from an induced power of said inductor generated when said third switching device discharges said capacitor, is superposed on an output of said converter circuit.

3. The semiconductor light emitting element drive device as set forth in claim 1, wherein an ON and OFF frequency of said second switching device is set to a higher frequency than that corresponding to a video equipment's shutter speed.

4. The semiconductor light emitting element drive device as set forth in claim 2, wherein an ON and OFF frequency of said third switching device is set to 120 Hz or more.

5. The semiconductor light emitting element drive device as set forth in claim 2,
   wherein the second ratio is set to be smaller than the first ratio, and
   said control unit is configured:
   to keep said third switching device turned off in a range where the dimming ratio of said light source unit is higher than the second ratio; and
   to control ON and OFF of said third switching device in a range where the dimming ratio of said light source unit is lower than the second ratio.

6. The semiconductor light emitting element drive device as set forth in claim 2,
   wherein the second ratio is set to equal to the first ratio, and
   said control unit is configured:
   to keep said third switching device turned off in a range where the dimming ratio of said light source unit is higher than the second ratio; and
   to control ON and OFF of said third switching device in a range where the dimming ratio of said light source unit is lower than the second ratio.

7. The semiconductor light emitting element drive device as set forth in claim 2, wherein said control unit comprises a microcomputer configured to control ON and OFF of at least one of said first to third switching devices based on a dimming signal from outside.

8. The semiconductor light emitting element drive device as set forth in claim 1,
   wherein said transformer further has a third-secondary winding of a reversed polarity to said first-secondary winding, and
   said semiconductor light emitting element drive device generates a drive power of said current regulation circuit by commutating and smoothing a voltage generated across said third-secondary winding.

9. A lighting fixture, comprising the semiconductor light emitting element drive device as set forth in claim 1,
   wherein said lighting fixture comprises:
   said light source unit which comprises light emitting elements and is adapted to be driven with said semiconductor light emitting element drive device; and
   a fixture body in which said semiconductor light emitting element drive device and said light source unit are placed.

* * * * *